(12) United States Patent
Brookner

(10) Patent No.: US 7,107,836 B2
(45) Date of Patent: Sep. 19, 2006

(54) RADIO FREQUENCY TAGGING FOR INDICIA PRINTING AND PRODUCT INFORMATION

(75) Inventor: George Brookner, Norwalk, CT (US)

(73) Assignee: Neopost Industrie SA, Bagneaux (FR)

(*) Notice: Subject to any disclaimer, the term of this patent is extended or adjusted under 35 U.S.C. 154(b) by 0 days.

(21) Appl. No.: 10/742,338

(22) Filed: Dec. 19, 2003

(65) Prior Publication Data

US 2005/0132796 A1 Jun. 23, 2005

(51) Int. Cl.
*G01F 23/00* (2006.01)
*G08B 21/00* (2006.01)

(52) U.S. Cl. .................................. 73/290 R; 340/612
(58) Field of Classification Search ............. 73/290 R, 73/304 C; 324/663, 633, 664, 667; 340/612, 340/618; 116/227
See application file for complete search history.

(56) References Cited

U.S. PATENT DOCUMENTS

| | | | |
|---|---|---|---|
| 5,832,772 A | 11/1998 | McEwan | 73/290 R |
| 5,951,918 A | 9/1999 | Kuwajima et al. | 252/514 |
| 6,165,386 A | 12/2000 | Endo et al. | 252/500 |
| 6,467,888 B1* | 10/2002 | Wheeler et al. | 347/85 |
| 6,496,806 B1 | 12/2002 | Horwitz et al. | 705/28 |
| 6,546,795 B1* | 4/2003 | Dietz | 73/290 R |
| 6,566,997 B1 | 5/2003 | Bradin | 340/10.2 |
| 2003/0004608 A1* | 1/2003 | O'Dougherty et al. | 700/244 |
| 2003/0051767 A1* | 3/2003 | Coccaro et al. | 141/351 |
| 2004/0124988 A1* | 7/2004 | Leonard et al. | 340/612 |

FOREIGN PATENT DOCUMENTS

| | | |
|---|---|---|
| DE | 19901814 A1 | 7/2000 |
| GB | 2308947 A | 9/1997 |
| WO | WO 9913441 | 3/1999 |
| WO | WO 00/79497 A1 | 12/2000 |
| WO | 2004/049237 | 6/2004 |

OTHER PUBLICATIONS

Forefront, College of Engineering—University of California, Berkeley "Will printed circuits replace barcodes on tomorrow's soup cans?", David Pescovitz, Spring 2002, 2 pages.
CONFIDENT™, "RFID—general information", www.tagmaster.com, May 2003, 2 pages.
The IDTechEx Web Journal, Smart Labels Analyst, "Smart Labels USA 2003 Conference Review", Apr. 2003, 23 pages.
GTAG™ "EAN-UCC White Paper on Radio Frequency Identification", Uniform Code Council, Inc., Jun. 2002, 21 pages.
Examensarbete, "Investigation of paperbased RFID with integrated sensors", Jan Lundgren, Nov. 2002, 38 pages.

(Continued)

Primary Examiner—Hezron Williams
Assistant Examiner—Tamiko Bellamy
(74) Attorney, Agent, or Firm—Kenyon & Kenyon LLP

(57) ABSTRACT

A method and apparatus for detecting a level of a content in a vessel using an RFID tag. In one embodiment, an RFID tag located on one side of the vessel opposite a side on which the reader is, is interrogated. A reply signal, if any, received from the RFID tag is interpreted to determine the information returned from the RFID tag. The level of the content in the vessel is determined based on the information received from the RFID tag.

20 Claims, 5 Drawing Sheets

OTHER PUBLICATIONS

"Using low power transponders and tags for RFID Applications", Thierry Roz et al., 8 pages.

"Tag-it HF-I Transponder Inlays—Reference Guide", Edition Three—May 2002, 32 pages.

"RFID, a week long survey on the technology and its potential", Mario Chiesa et al, Mar. 2002, 47 pages.

On My Wavelength, "RF identification tags: Show me the money", Jeremey Donovan, May 2003, p. 41.

* cited by examiner

RADIO FREQUENCY TAGGING FOR INDICIA PRINTING AND PRODUCT INFORMATION

BACKGROUND OF THE INVENTION

1. Field of the Invention

The present invention relates to RFID interrogation systems and, more particularly, to monitoring fluid levels using RFID tags.

2. Brief Description of Related Developments

Radio Frequency Identity or Identification (RFID) is a means of storing and retrieving data through electromagnetic transmission to an RF compatible integrated circuit.

Read-only transponders store information that can be electronically "read". The stored information can be for example, a unique code. In some systems, a signal can be sent to a RFID tag, which charges the tag and allows the information stored in the tag to be returned.

RFID systems have several basic components or technical characteristics that define them. Referring to FIG. 1, generally, these are a reader 2, including an antenna 7 (the device that is used to read and/or write data to RFID tags), a tag 8 (a device that transmits to a reader the data) and the communication between them (RFID uses a defined radio frequency and protocol to transmit and receive data from tags). The reader 2 can be coupled to a computer 4, which might also be connected to a database 6.

RFID tags are generally classified as active tags and passive tags, as defined by their power source.

Active tags contain both a radio frequency transceiver and a battery to power the transceiver. Because there is a transceiver on the tag, active tags have substantially more range (approximately 300 feet or more) than passive or "active/passive tags." Active tags are also considerably more expensive than passive tags and, as with any battery-powered product, the batteries must be replaced periodically or the product life cycle is less than the battery life.

Passive tags can be either battery or non-battery operated, as determined by the intended application. Passive tags reflect the RF signal transmitted to them from a reader or transceiver and add information by modulating the reflected signal. A passive tag does not use a battery to boost the energy of the reflected signal. A passive tag may use a battery to maintain memory in the tag or power the electronics that enable the tag to modulate the reflected signal. Battery-less ("pure passive" or "beam powered") tags do not contain an internal power source such as a battery. These purely passive or "reflective" tags rely upon the electromagnetic energy radiated by an interrogator to power the RF integrated circuit that makes up the tag itself.

There is a version of a passive tag that does contain a battery. This type of passive tag with a battery ("active/passive") has some of the enhanced, and speed attributes of a true active tag, but still communicates in the same method, as do other passive tags. These active/passive tags that do contain an internal power source, usually are much more complex integrated circuits with multiple components.

RF tags can also be distinguished by their memory type. Read/write memory, can be read as well as written into. Its data can be dynamically altered. Read only (typically "chipless") type of tag memory is factory programmed and cannot be altered after the manufacturing process. Its data is static.

The tags and a reader communicate by wireless signal in a process known as coupling. Two methods of wireless signal distinguish and categorize RFID systems. Close proximity electromagnetic or inductive coupling systems and propagating electromagnetic waves. Coupling is via antenna structures forming an integral feature in both tags and readers.

An inherent weakness of RFID technology is that readings are affected by liquid in the transmission path. If there is liquid between the reader and the tag, reading the tag is not possible and the effects of this increase with the increase of the transmission frequency.

SUMMARY OF THE INVENTION

The present invention is directed to detecting a level of a content in a vessel using an RFID tag. In one embodiment, an RFID tag located in proximity to one side of the vessel opposite a side on which the reader is, is interrogated. A reply signal, if any, received from the RFID tag is interpreted to determine the information returned from the RFID tag. The level of the content in the vessel is determined based on the information received from the RFID tag. In another aspect the present invention is directed to a system for monitoring a level of a liquid in a vessel. In one embodiment an RFID tag is located on one side of the vessel. A RFID reader is located on another side of the vessel opposite the RFID tag. As the liquid level drops, the RFID tag is exposed allowing the RFID reader to interrogate the tag and for the tag to return information to the reader.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(S)

Figure 1:
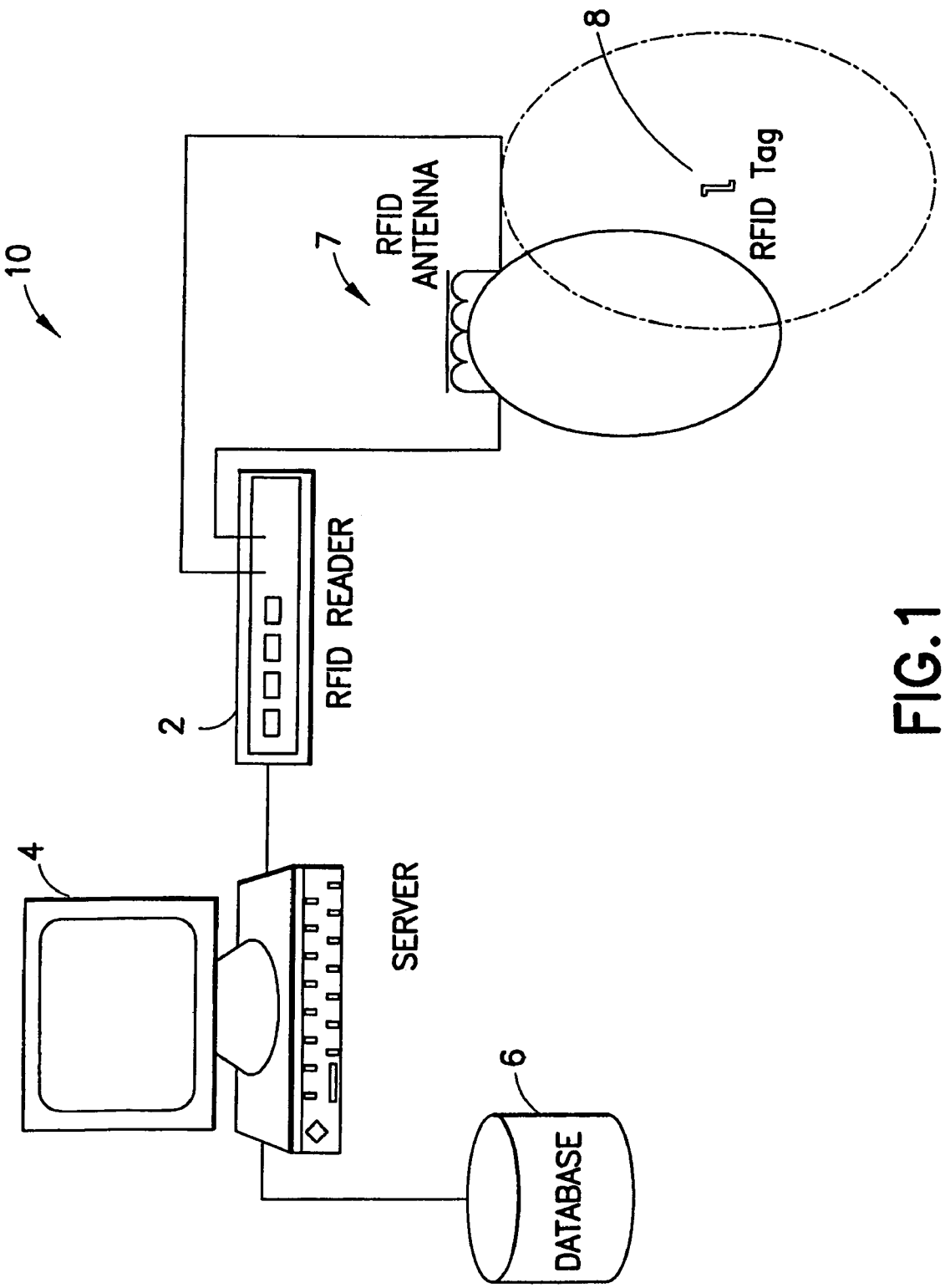
FIG. 1 is one embodiment of an RFID interrogation and reader system.
Figure 2:
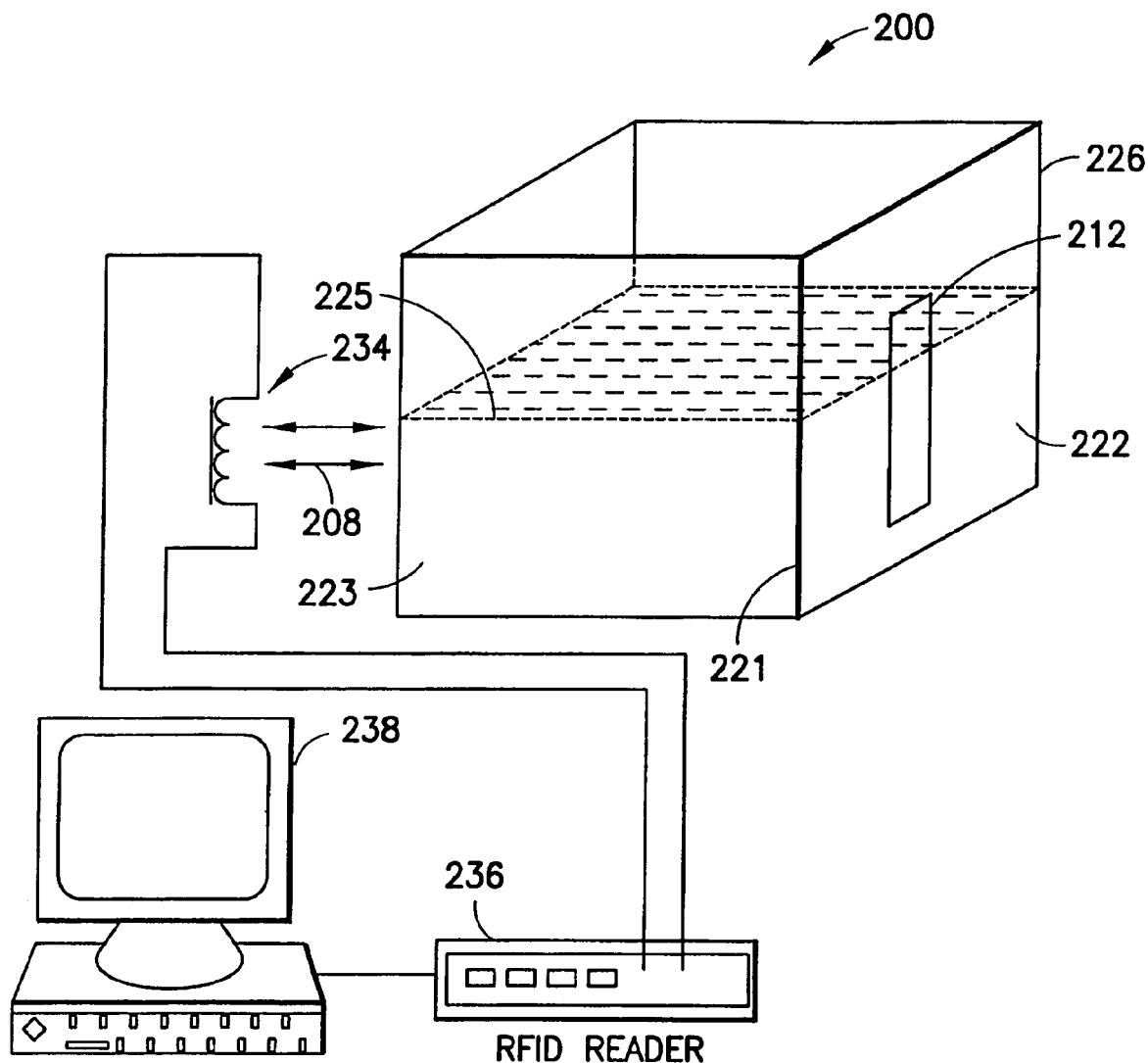
FIG. 2 is a block diagram of one embodiment of a system incorporating features of the present invention.

Referring to FIG. 2, a perspective view of a system 10 incorporating features of the present invention is illustrated. Although the present invention will be described with reference to the embodiment shown in the drawings, it should be understood that the present invention can be embodied in many alternate forms of embodiments. In addition, any suitable size, shape or type of elements or materials could be used.

In one embodiment, referring to FIG. 2, a container or vessel 226 includes an RFID tag 212 mounted on a surface of the container 226 or in close proximity to the surface of the container 226. The tag does not need to be mounted on the container 226. Although a substantially square shaped container 226 is illustrated, it will be understood that in alternate embodiments any suitably shaped container or vessel can be used. The RFID tag 212 can be mounted on either an interior surface 221 or exterior surface 222 of the container 226, or positioned in close proximity to the container 226. The orientation must be such that when the container 226 has an amount of liquid 223 or fluid in it greater than a predetermined level, the fluid 223 blocks interrogation of at least a portion of the tag 212. The reader 236 should only be able to interrogate the "exposed" portion (s) of the tag 212. The container 226 can include a liquid 223, such as for example ink. The ink could comprise a liquid or dry ink. A toner could be included. In one embodiment, the container 226 can comprise an ink cartridge. Although the present invention is described in terms of ink and in terms of ink and ink cartridges, it will be understood that any suitable fluid or liquid could be contained in the container 226. Furthermore, the container 226 could also include other products that are consumed during use, such as for example toner, dry ink, oil, fuel or butane. Generally, any liquid or solid product contained within a container that interferes with or affects the transmission between a reader and an RFID tag can be monitored using the present invention.

Referring to FIG. 2, the RFID reader antenna 234 is disposed along the outside of the container 226, attached thereto, or in close proximity thereto, so that when the RFID tag 212 is at least partially exposed, the reader 236 can interrogate at least the exposed portion of the tag 212. Thus, although an angle of intercept orientation of approximately 90° is shown between the tag 212 and reader antenna 234 in FIG. 2, the reader 24 can be disposed at any suitable angle other than including 90° relative to the tag 212.

When the level 225 of liquid or fluid level in the container 226 obscures all or partially all of the tag 212, the tag 212 will be considered to be in a "non-active" state. Since the fluid 223 "covers" or obscures the tag 212, the transmission path 208 is effected and the tag 212 will not respond to interrogation by the reader 236. The lack of response or a faulty response to interrogation could be considered to be an indication that the container 226 is "full" or that the level 225 of fluid 223 is at or above a predetermined or acceptable level. As the level 225 changes and the tag 212 is exposed, the tag 212 will begin to respond to interrogation by the reader 236.

Figure 4:
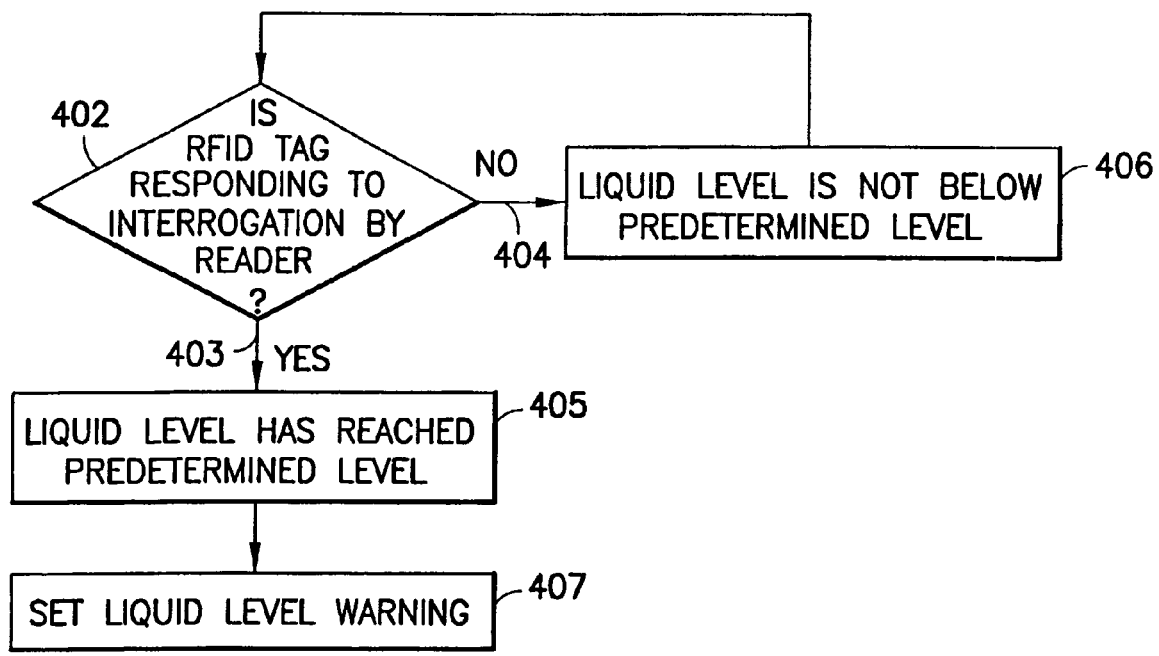
FIG. 4 is a flowchart of one embodiment of a method incorporating features of the present invention.

For example, referring to FIG. 4, the RFID tag is interrogated and it is determined 402 if the tag is responding. If the tag is not responding 404, the liquid level is not below the predetermined level 406. If the tag is responding 403, the liquid level has reached a predetermined level 405 and a liquid level warning can be set or activated 407.

Figure 3:
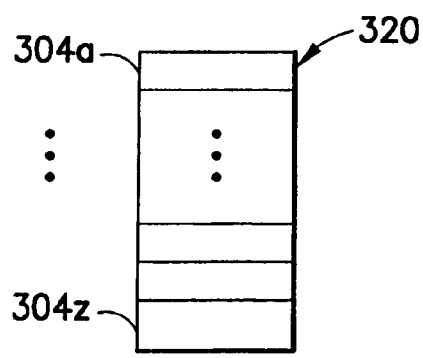
FIG. 3 is an illustration of one embodiment of a RFID tag to be used with the present invention.

Referring to FIG. 3, the tag 320 could be divided into portions 304a–304z that each return specific or unique information to that portion 304a–304z. The information returned by the exposed portion 304a–304z, will provide an indication to the reader 236 of FIG. 2 as to the level 225 of fluid 223 in the container 226. In one embodiment, the exposure of a certain portion or section of the tag 320 of FIG. 3 returns certain information or data to the reader upon interrogation. The type of data can be used to identify the fluid level.

In one embodiment, when the level 225 of fluid 223 in the container 26 of FIG. 2 is at a predetermined "full" or other acceptable level, only a portion 304a of the tag 320 of FIG. 3 may be exposed. Alternatively, none of the tag might be exposed. If exposed, upon interrogation by the reader 236, the tag 212 would identify or provide information about the container 226 or cartridge, identifying the container 226 as a valid or authorized item. The system within which the container is included could then be enabled for operation. If upon interrogation by the reader 236, no signal is returned, the tag 212 could be invalid and the system could be disabled. The lack of a return signal could be the result the absence of or misalignment the container 226 in the system, or the use of a unauthorized or unacceptable container 226. For example, if an unauthorized replacement toner or ink cartridge is inserted into a printing system, the lack of an RFID tag 212, an improper tag or a misalignment of the tag 212 with the reader antenna 234, will not allow the system to operate. The present invention also provides the ability to monitor the use of authorized parts and components within, for example a printing or reproduction system or a postage meter or postage franking system. An unauthorized component, or Consumer Replacement Module ("CRM"), such as an ink cartridge, may not include an RFID tag 212, or at least a valid and authorized RFID tag. Upon interrogation, the absence of a return signal or an invalid signal, will indicate use within the system of an unauthorized cartridge or replacement cartridge.

In one embodiment, the interrogation of a low portion 304z of the tag 320 of FIG. 3 could indicate that the container is empty or substantially empty, and that replacement or refilling is required. An alert or alarm, visual or aural, could be activated. A reset could also be activated that would prevent the use of a replacement or refill until an authorized service or some other authorized intervention takes place.

A change in fluid level is sensed by the RFID tag going from a normal inactive state (not responding to interrogation by the reader) to an active state responding to interrogation by the reader). The reader's proximity to the liquid vessel will be such that with a reader power output of a minimal value and the operating frequency as high as possible, the proximity, frequency and power setting will cause the reader to switch from an active read (RFID tag responding) to an inactive read (RFID tag not responding) when a liquid level is above the trip point which causes the reader to no longer receive a response from the RFID tag. At the point when the RFID tag responds (e.g. a level below the predetermined point) the server or other monitoring system may notify the operator of the liquid level condition. The passive RFID tag can provide ever increasing amounts of data as the liquid depletes and exposes more and more of the RFID tag. At the switching point, only a small amount of the RFID tag is exposed to the reader's transmitted energy. Therefore a limited amount of energy from the tag is available, and a limited amount of data can be transmitted from the tag to the reader. As the tag is exposed, the tag receives more energy from the reader, and the tag therefore has more energy to transmit more data. The customer is then provided with more information about the level of the fluid (e.g. level trip warning-to-level low warning-to-limited liquid remains-to-liquid depleted, or 10%, 5%, 2% remaining). In one embodiment where an active tag is used, the active tag can be configured to continuously transmit or periodically transmit. The transmission being received by receiver 236, indicates fluid level trip point, or if not received, indicates fluid above the trip unit.

Figure 5:
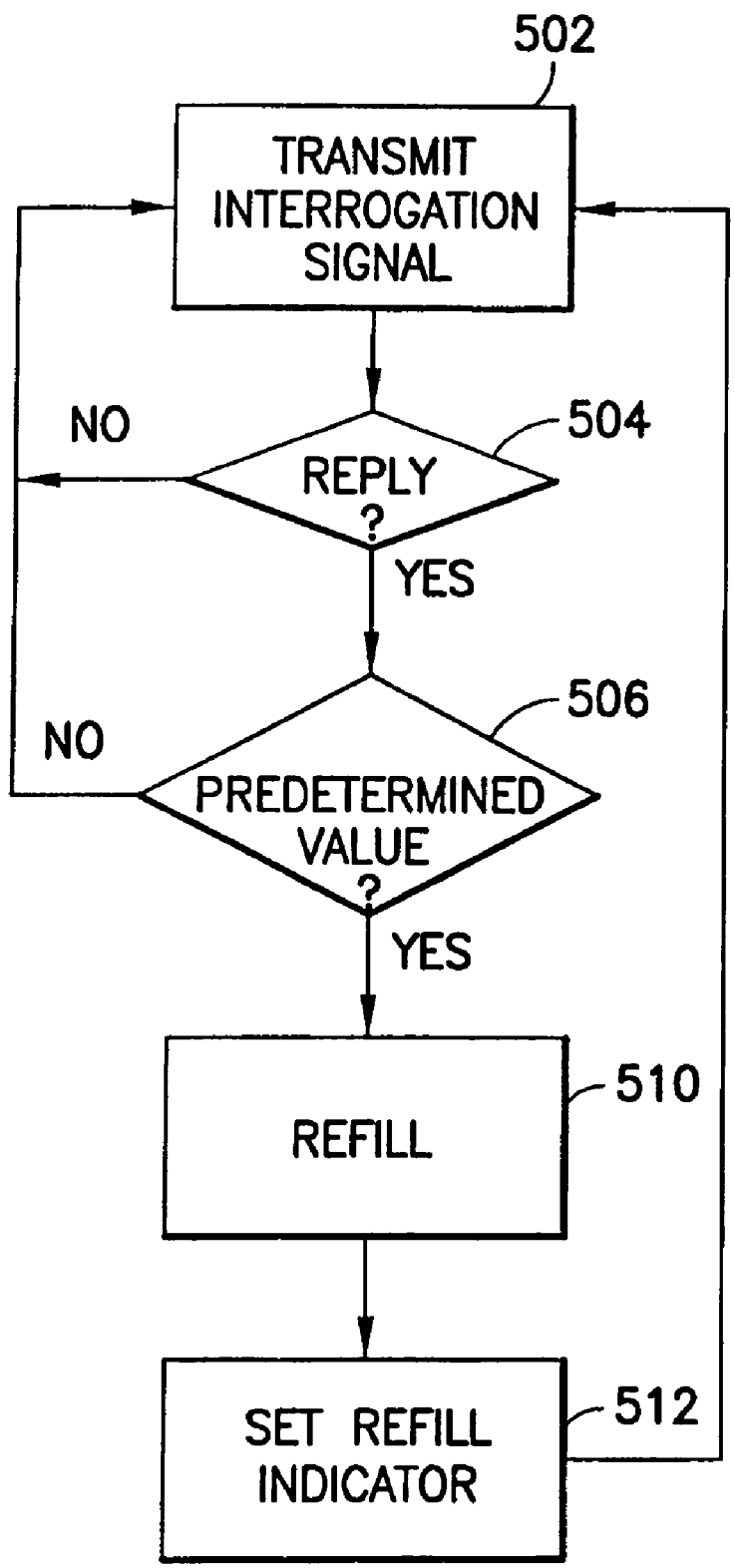
FIG. 5 is a flowchart of another embodiment of a method incorporating features of the present invention.

In one embodiment referring to FIG. 5, the reader 236 of FIG. 2 transmits 502 the interrogation signal. If no reply 504 is received, the reader 236 continues to transmit the interrogation signal, either continuously when power is applied, or at regular intervals. If a signal is returned, the information in the signal is evaluated to determine 506 if the information has reached or is equivalent to a predetermined value. The predetermined value generally relates to a low level of fluid in the container 226. If the predetermined value had not been reached, the reader 236 continues to generate the interrogation signal in step 502. If the information does correspond to the predetermined value, then a warning or notification 510 can be issued that refill is required. In one embodiment, a signal or flag can be set 512 that requires a service operator or other authorization that a refill is authorized. If the set flag is not reset, operation of the unit is disabled.

Figure 6:
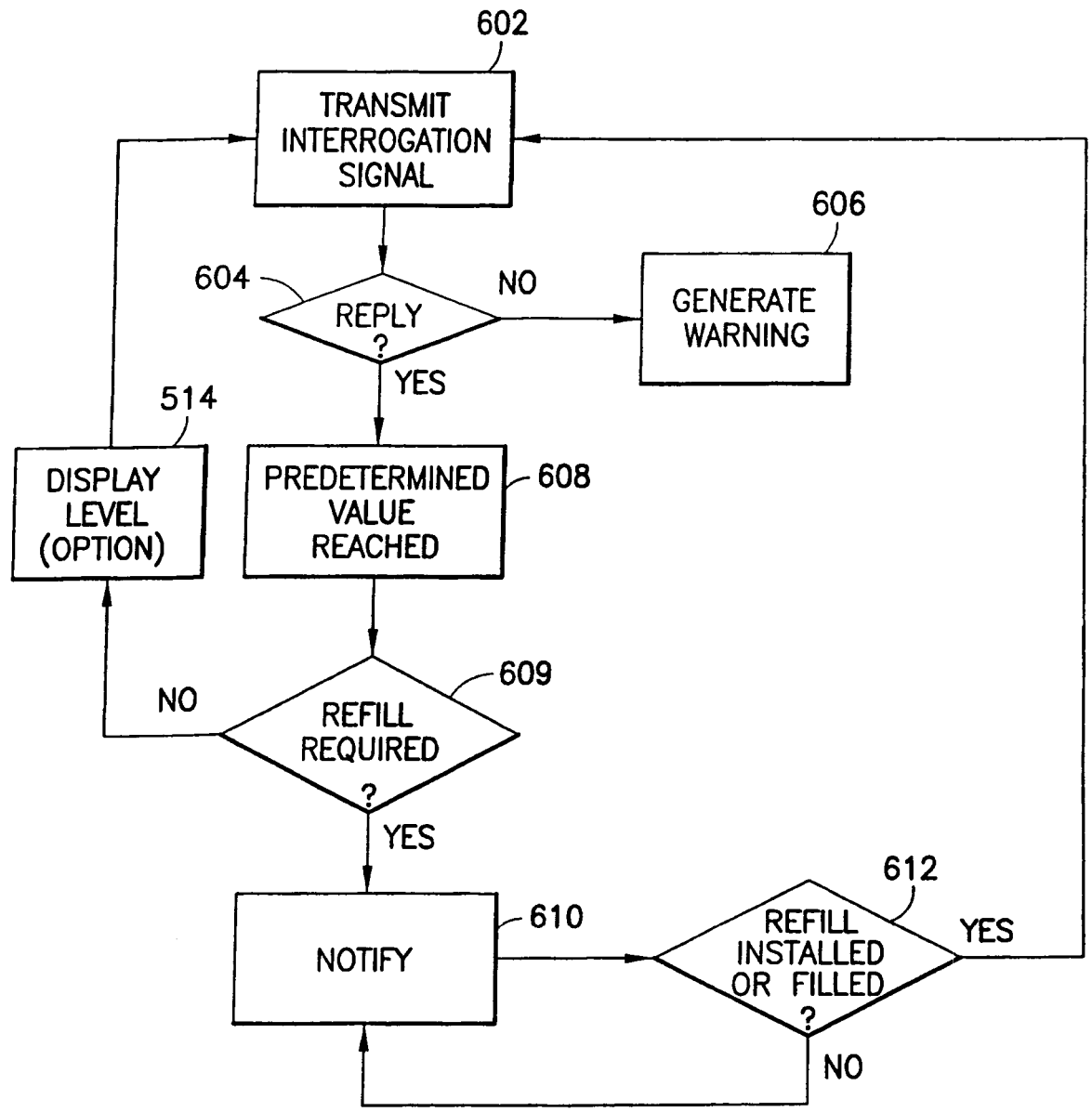
FIG. 6 is a flowchart of a further embodiment of a method incorporating features of the present invention.

Referring to FIG. 6, the system 200 of FIG. 2 includes an RFID tag 320, the type illustrated in of FIG. 3 that has multiple zones, 304a–304z, for returning specific information for each level of fluid in the container 26. In this embodiment, a top level 304a of the RFID tag could always be exposed to allow interrogation and verification that an authorized container 226 is in place. Upon interrogation 602, if no signal is returned 604, a warning is issued 606. If a signal is returned in step 604, then the value of the signal is determined 608 to see if it matches a predetermined or preset value. This value indicates the level of fluid or solid in the container 226 and the predetermined level is the level at which user interaction or refill is required. The value identifies whether refill is required 609. If yes, an administrator or other personnel can be notified 610 that refill 612 is required. The refill could include actually refilling the container, or in one embodiment, the replacement of the empty container with the full container. Once the refill is installed, interrogation 602 resumes. If no signal or an inappropriate signal is returned, it can immediately be determined if the replacement or refill is authorized. As the fluid level decreases and the values are reported 608, the level of fluid or solid could optionally be displayed 614.

The present invention allows the use of a RFID tag system to monitor the level of a fluid, liquid or solid within a container. As the RFID tag becomes exposed during consumption of the product, the returned information can be used to determine the level in the container and provide warnings either before the container is empty or when empty. The RFID tag can also be used to verify that an authorized replacement is used when a CRUM is replaced.

In this manner, an RFID reader or readers can be utilized to sense liquid levels. For example, the water level or ink level in a postage meter or other mailing machine. A postage meter can use ink to produce postal indicia and other mailings, while water can be used to activate adhesives on envelopes or stamps as they pass through the machine. When the container is full, and the RFID tag is behind the liquid, the tag does not respond to interrogation. When the level drops, the tag is exposed and can respond.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

The invention claimed is:

1. A method of detecting a level of a content in a vessel using an RFID tag:
    interrogating an RFID tag in close proximity to one side of the vessel using a reader in close proximity to an opposite side of the vessel;
    interpreting a presence or absence of a reply signal received from the RFID tag to determine information returned from the RFID tag; and
    determining that the level of the content in the vessel is above or below a predetermined level based on the information received from the RFID tag.

2. The method of claim 1 wherein a lack of the reply signal indicates that the vessel is full.

3. The method of claim 1 wherein a portion of the RFID tag is always exposed and a reply indicates at least an existence of the RFID tag.

4. The method of claim 1 wherein a first reply signal from the RFID tag indicates a first level in the vessel and a second reply signal indicates a second level in the vessel.

5. The method of claim 1 wherein the content is a liquid.

6. The method of claim 1 wherein the content is a solid.

7. The method of claim 1 wherein the RFID tag is mounted on one side of the vessel.

8. The method of claim 1 wherein a change in fluid level is sensed by the RFID tag not responding to interrogation by the reader to responding to the interrogation.

9. A system for monitoring a level of a liquid in a vessel comprising:
    a RFID tag in close proximity to one side of the vessel;
    a RFID reader located in close proximity to another side of the vessel, positioned to be able to interrogate the RFID tag; and
    wherein as the level of the content of the vessel lowers, the RFID tag is exposed and can be interrogated by the reader to determine that the level of the liquid in the vessel is above or below a predetermined level.

10. The system of claim 9, wherein the system is a postage meter and the vessel is an ink container.

11. The system of claim 9 wherein the RFID tag is positioned in relation to the vessel so that at least a portion of the tag remains exposed when the level of the liquid is at a high point.

12. The method of claim 1 further comprising the RFID tag being active and able to be interrogated when a portion of the RFID tag is exposed.

13. The system of claim 9 wherein the RFID tag cannot transmit signals through the liquid.

14. The method of claim 1 wherein the RFID tag is electrically separated from the content of the vessel.

15. The method of claim 14 wherein the RFID tag is on an exterior of the vessel.

16. The method of claim 1 wherein the RFID tag is a passive RFID tag.

17. The system of claim 9 wherein the RFID tag is electrically separated from the liquid in the vessel.

18. The system of claim 9 wherein the RFID tag is mounted on an exterior of the vessel.

19. The system of claim 9 wherein the RFID tag is a passive RFID tag.

20. The method of claim 4, wherein the second level is lower than the first level.

* * * * *

UNITED STATES PATENT AND TRADEMARK OFFICE
CERTIFICATE OF CORRECTION

PATENT NO. : 7,107,836 B2  Page 1 of 1
APPLICATION NO. : 10/742338
DATED : September 19, 2006
INVENTOR(S) : George Brookner It is certified that error appears in the above-identified patent and that said Letters Patent is hereby corrected as shown below:

| Column | Line | |
|---|---|---|
| 1 | 61 | Change "(typically "chi-" to --(typically "chip- --. |
| 1 | 62 | Change "pless")" to --less")--. |
| 4 | 28 | Change "state responding" to --state (responding--. |

Signed and Sealed this

Third Day of April, 2007

JON W. DUDAS
*Director of the United States Patent and Trademark Office*